(12) United States Patent
Ekström et al.

(10) Patent No.: US 6,526,291 B1
(45) Date of Patent: Feb. 25, 2003

(54) METHOD AND A SYSTEM FOR RADIO TRANSMISSION

(75) Inventors: Stig Ekström, Järfälla (SE); Leonard Rexberg, Hässelby (SE); Christer Nilsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/236,394

(22) Filed: Jan. 25, 1999

(30) Foreign Application Priority Data

Jan. 30, 1998 (SE) ............................................... 9800272

(51) Int. Cl.[7] ............................. H04B 1/38; H04M 1/00
(52) U.S. Cl. ....................... 455/562; 455/101; 455/63; 455/69; 455/67.3
(58) Field of Search ................................ 455/101, 561, 455/63, 67.1, 67.3, 296, 562, 69

(56) References Cited

FOREIGN PATENT DOCUMENTS

| WO | 96/37973 | 11/1996 |
|----|----------|---------|
| WO | 96/37974 | 11/1996 |

*Primary Examiner*—Vivian Chin
*Assistant Examiner*—James Moore
(74) *Attorney, Agent, or Firm*—Nixon & Vanderhye P.C.

(57) ABSTRACT

In a cellular radio system down-link diversity is provided. The system has means in a base station (BS) for receiving signals from a mobile station (MS) using a diversity reception arrangement, in particular an antenna diversity arrangement (207, 209). Information regarding the current reception conditions is extracted from the reception diversity system and is used for improving the transmission. Thereby the transmitted signals can have less signal power, which in turn makes it possible to provide smaller cluster sizes and thereby increase the channel capacity in the cellular radio system.

14 Claims, 4 Drawing Sheets

METHOD AND A SYSTEM FOR RADIO TRANSMISSION

TECHNICAL FIELD

The present invention relates to a method and a system for radio communication.

DESCRIPTION OF RELATED ART

In cellular radio systems the number of cells used for covering a particular area should be as small as possible in order to minimize the costs. However, in order to maintain a sufficiently good signal to noise ratio (SNR) for a system having many mobile stations, the cell size should be as small as possible.

Thus, using a small cell size the same signals can be reused at other locations in the cellular radio system. In a system having M orthogonal signals or channels these are usually divided into K groups having the same or close to the same number of channels. In a hexagonal cell pattern with the base station located in the middle of the cell, see FIG. 1$a$, K can be any integer written as $$K=(i+j)^2-ij,$$

where i,j=0,1,2,3, . . .
Thus K can be K=3,4,7,9,12,13, . . .

A group of cells where each channel group is used once is usually termed cluster. K is therefore usually termed cluster size.

It is also common to use more advanced cell structures, where the base stations use directive antennas located in the corners of the cells, see FIG. 1$b$. A cell structure having a cluster size of 12 and 4 base station locations per cluster is denoted a 4/12 cluster and same way a cell structure having cluster size of 21 and 7 base station locations per cluster is denoted a 7/21 cluster etc. Such arrangements have the advantage that several base stations can be located at the same location, which is cost saving. The maximal distance from the base station to a mobile station will be increased but the number of interfering closely located base stations will be fewer.

In order to optimize the system for handling as many calls per cell as possible it is desired to have access to as many channels as possible per cell. This can be termed the capacity of the system (n), where n=$M/K$ For a certain system the number of channels M which can be used is usually predetermined. Hence, in order to increase the capacity of the cellular radio system the number of groups K should be as small as possible. How small the number of groups K can be is determined by how sensitive to noise and interfering signals the signals are.

In order to increase the performance in transmission on a fading radio-channel, diversity is employed. Diversity means that the same signal is transmitted via two or more transmission paths. There are many different types of diversity arrangement such as: frequency diversity, time diversity, polarisation diversity and spatial diversity etc. In spatial diversity or antenna diversity, several antennas are used when receiving the signal. It can be shown that if the distance between two antennas is sufficiently long the signals at the different antennas will be uncorrelated.

The distance required is mainly dependent on the wavelength used in the transmission. A distance of about the wavelength divided by 2 can be sufficient to reduce the correlation to acceptable levels. The longer the distance between the antennas, the less correlation. However, very long distances may not be feasible. A normal value can be about 12–20 times the wavelength used.

Antenna diversity has the advantage of not requiring a larger frequency range. Also the implementation of an antenna diversity arrangement is quite simple.

In cities and other areas having a large concentration of mobile stations (mobile telephones), the frequency range available is very limited in comparison to the heavy concentration of mobile stations. In this environment frequency diversity systems and other types of diversity system increasing the required frequency range are not possible to use, since the number of channels available would be to low to cope with the large number of mobile stations. Therefore, the use of antenna diversity systems is preferred in many cases.

The receiver can use or weigh the signals from the different antennas in a number of different ways. The most common methods are:

Selection diversity: The receiver chooses the signal having the highest signal to noise ration (SNR) and uses this signal for the signal detection.

Maximum ratio combining diversity: The receiver uses the information from all the reception branches all at the same time. The signals from the different branches are given a weight which is proportional to the SNR at the respective branch. When using the method the individual signals must have the same phase when the addition takes place. Thus, it is necessary to implement a phase compensation circuit. The phase compensated and optimal weighted signal is then used as the output signal.

Equal gain combining diversity: This is a special case of the Maximum ratio combining diversity system. Thus, in order not to have to measure the momentary SNR in each reception branch the weight is set constant and equal for all the branches.

Switched diversity: This is a simple method. Thus, one branch at a time is used and switching between different branches is only carried out when the signal envelop drops below a certain threshold value.

The use of diversity systems is a powerful tool in order to avoid long fading conditions.

However, the diversity systems of today cannot be used for significantly increasing the channel capacity for cellular radio systems. The limitation in channel capacity is an increasing problem, since the frequency range available is limited and the number of mobile terminals is constantly increasing.

SUMMARY

It is an object of the present invention to improve the channel capacity for cellular radio systems. This object is obtained by using a diversity arrangement in the base station, which makes use of the information obtained when receiving signals in an antenna diversity system for transmission purposes.

The radio transmission system is therefore equipped with means in the base station for extracting information regarding the current diversity conditions and the extracted information is used for controlling the transmission of the downlink signals according to a diversity (down-link) transmission scheme.

Thus, the same information used for the reception of the signal (up-link signal) is applied in a corresponding manner for transmission of the signal (down-link signal). This makes it possible to use less power in the transmitted signals whereby the cluster sizes can be reduced. This in turn results in a larger channel capacity according to the above.

The use of such a down-link diversity arrangement therefore provides a system operator with a tool by means of which he can easily increase the number of mobile stations without having to use a larger frequency range. For example it will be possible to reduce the co-channel interference so that a 4/12 cluster will have the same speech quality as for traditional base stations in a 7/21 cell cluster.

BRIEF DESCRIPTION OF THE DRAWINGS

The present invention will now be described in more detail by way of non-limiting examples and with reference to the accompanying drawings, in which.

DESCRIPTION OF PREFERRED EMBODIMENTS

Figure 1A:
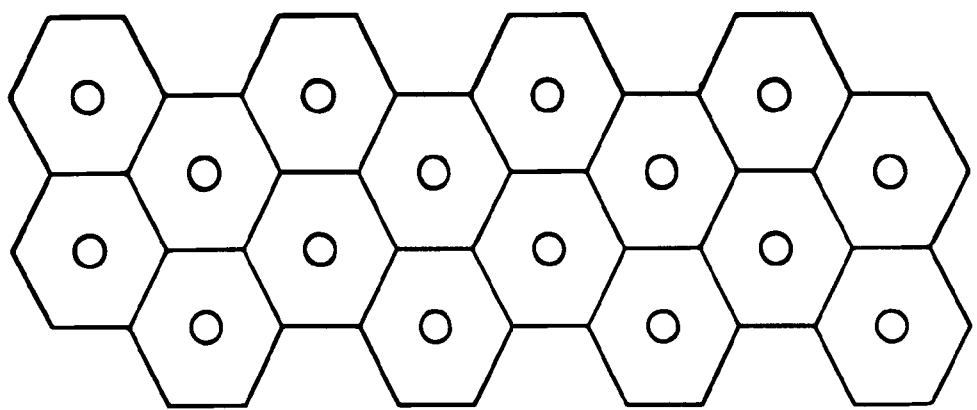
FIGS. 1a and 1b show hexagonal cell structures
Figure 1B:
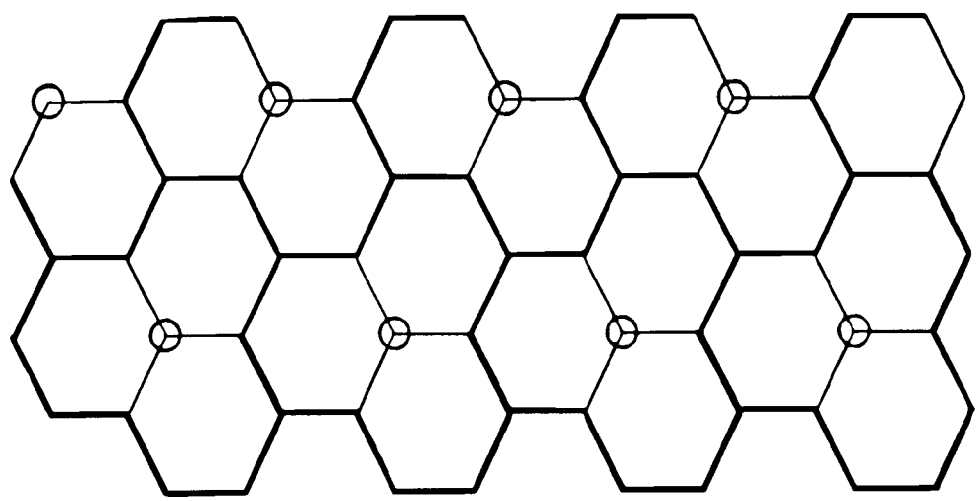
Figure 2:
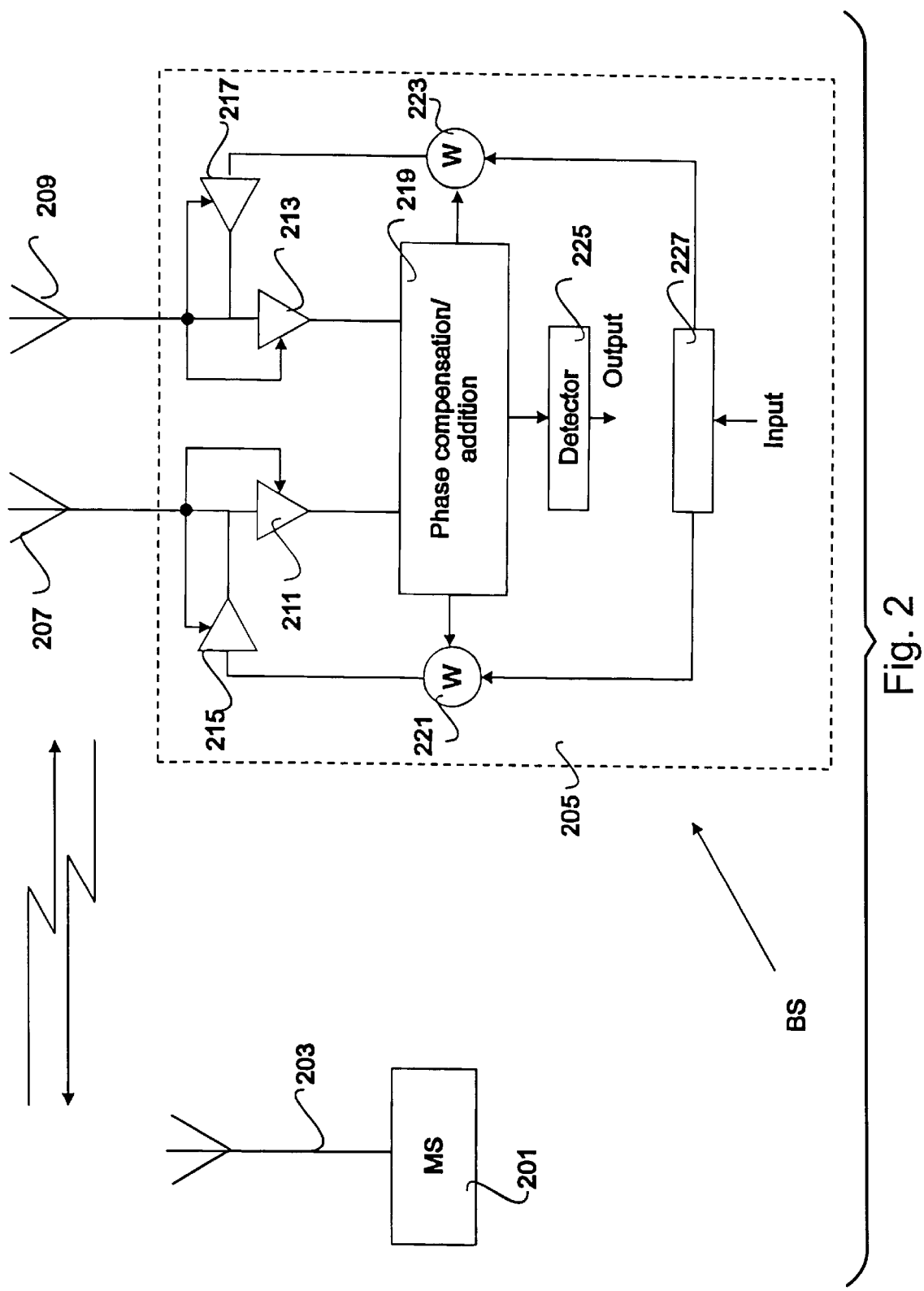
FIG. 2 shows a mobile station and a base station in a cellular radio system, where the base station has a combined receiver/transmitter using a diversity arrangement.

In FIG. 2 a principal view of a cellular radio transmission system is shown. Thus, a mobile station is shown at 201. The mobile station 201 has an antenna 203 by means of which it can communicate with a base station shown at 205. The base station 205 has two antennas 207 and 209.

The base station 205 shown in FIG. 2 is designed for maximum ratio combining diversity. Thus, the SNR is derived from the signals received by the antennas 207 and 209. The SNRs are used for setting amplifiers 211 and 213 to values corresponding to the measured SNRs. In other words, the receiving branch having a better SNR will be more amplified than the receiving branch having a small SNR.

The same value as is set for the amplifier 211 is at the same time set for an amplifier 215 and the same value set for the amplifier 213 is set for an amplifier 217. The amplifiers 215 and 217 form a part of the transmission circuit of the base station 205 and are also connected to the antennas 207 and 209, which thus are used both for transmission and reception of signals to/from the mobile station 201.

The output from the amplifiers 211 and 213 is fed to a circuit 219. The circuit 219 is used for phase compensation in order to give the two received signals the same phase, before they are added, which also takes place in the circuit 219. The information derived in the phase compensation circuit 219 is also fed to phase compensation circuits 221 and 223, which are part of the transmission circuit of the base station 205. The output from the circuit 219 is fed to a detector or demodulator circuit 225, which provides the output from the base station 205.

The base station is used for bi-directional communication with the mobile station 201. Thus, when transmitting signals from the base station 205 to a mobile station 201 the signal to be transmitted is fed to a modulator 227. The output from the modulator is fed on two different lines to the phase compensators 221 and 223. The phase compensators 221 and 223 are set according to the current phase compensation performed in the circuit 219. The output signals from the phase compensators 221 and 223 are then fed to the antennas 207 and 209, respectively.

Thus, the antennas 207 and 209 are duplex antennas which are used both for reception of signals and for transmission thereof. The antennas 207 and 209 are fed with transmission signals having the same phase compensation and the same signal strength relation as the SNR of the currently received signals.

This arrangement will have the effect that the signals transmitted from the base station 205 can be transmitted using a smaller signal power, while maintaining the same SNR at the receiving mobile station 201.

In a preferred embodiment the duplex antennas 207 and 209 are separated by a distance equal to half the wavelength used or an integer multiple thereof. It is also possible to use an arrangement having more than two antennas if that would turn out to be more useful in certain situations. For example, three or four antennas can be used in certain applications.

Furthermore, it is not necessary that the antenna diversity used in the base station is using a maximum ratio combining diversity algorithm for increasing the SNR. Other antenna diversity algorithms can also be used in the same manner. Thus, if selection diversity (as described above) is used the transmitting part of the base station will use the information provided by the receiving part and send information from the duplex antenna which is currently used for receiving signals from a mobile station.

Figure 3:
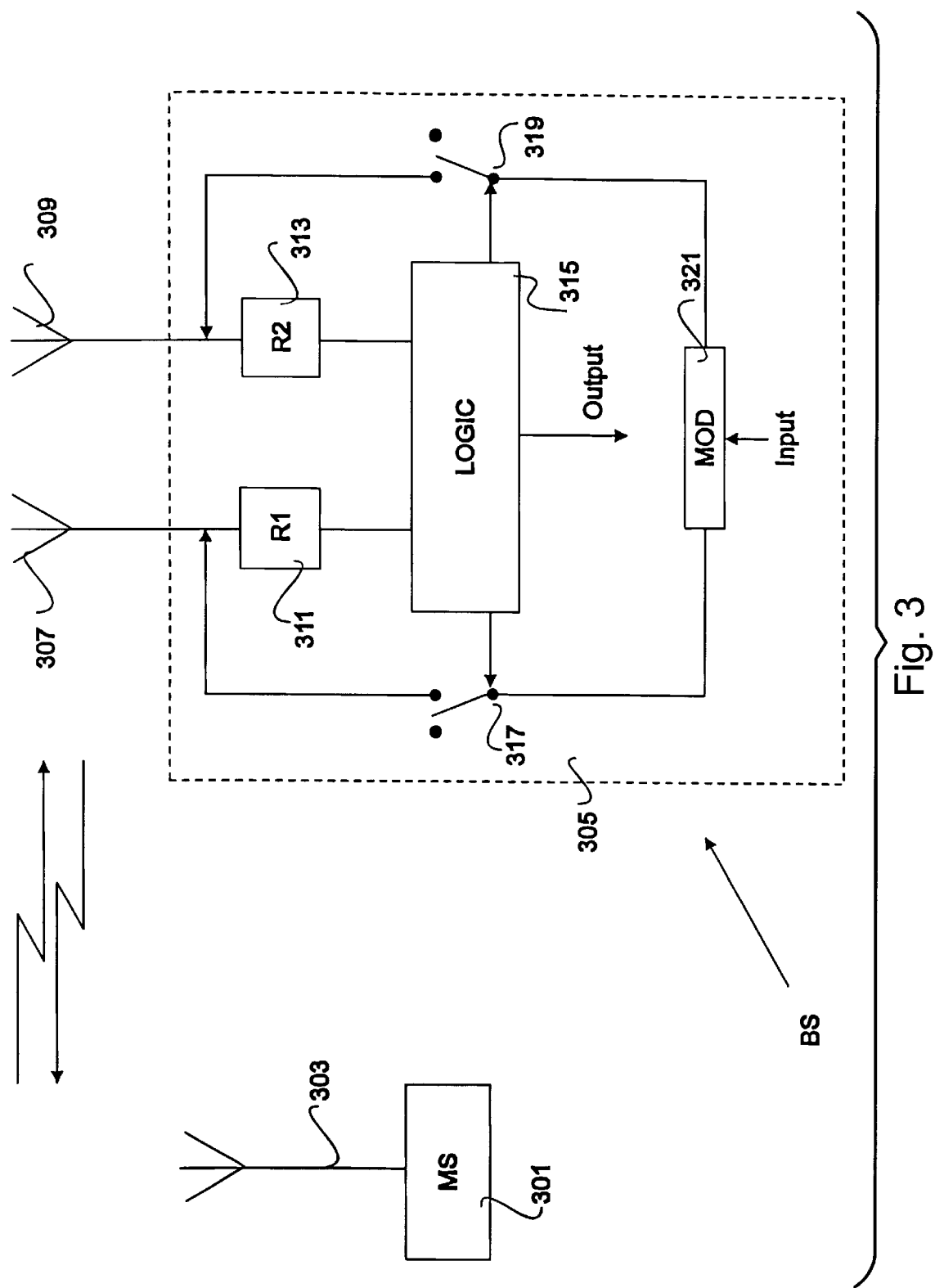
FIG. 3 shows a mobile station and a base station in a cellular radio system, where the base station has a combined receiver/transmitter using another diversity arrangement.

This is shown in FIG. 3. Thus, a mobile station 301 is transmitting and receiving signals via an antenna 303 to a base station 305. The base station 305 has two duplex antennas 307 and 309. The antennas 307 and 309 are connected to receivers 311 and 313, respectively. The output from the two receivers 311 and 313 is connected to a logic unit 315, which is arranged to choose the output signal from the two receivers having the highest SNR as output signal.

The logic unit 315 also controls two switches 317 and 319 so that only the antenna 307 or 309 which is currently used when receiving signals is used for transmission via a modulator 321.

Thus, when the base station 305 transmits signals to the mobile station 301 the input signal modulated in the modulator 321 is only transmitted via the antenna 307 or 309 which currently has the highest received SNR. In this manner, as in the case described above in conjunction with FIG. 2, a lower signal power can be used while maintaining the same SNR at the receiver site, i.e. the mobile station.

The idea of letting the information obtained by an receiving antenna diversity system be used for transmission of signals is of course not limited to the antenna diversity systems described above, all other antenna diversity systems can be used for obtaining the effect. In fact, the method of letting the information provided by a receiver diversity system is not even limited to antenna diversity systems it can equally well be implemented in other diversity systems, such as a frequency diversity system. In that case the frequency information obtained by the diversity system is used for transmission purposes, e.g. the frequency which currently provides the best SNR is used for transmission. However, this would require that the receiver has means for receiving at the different transmission frequencies.

Figure 4:
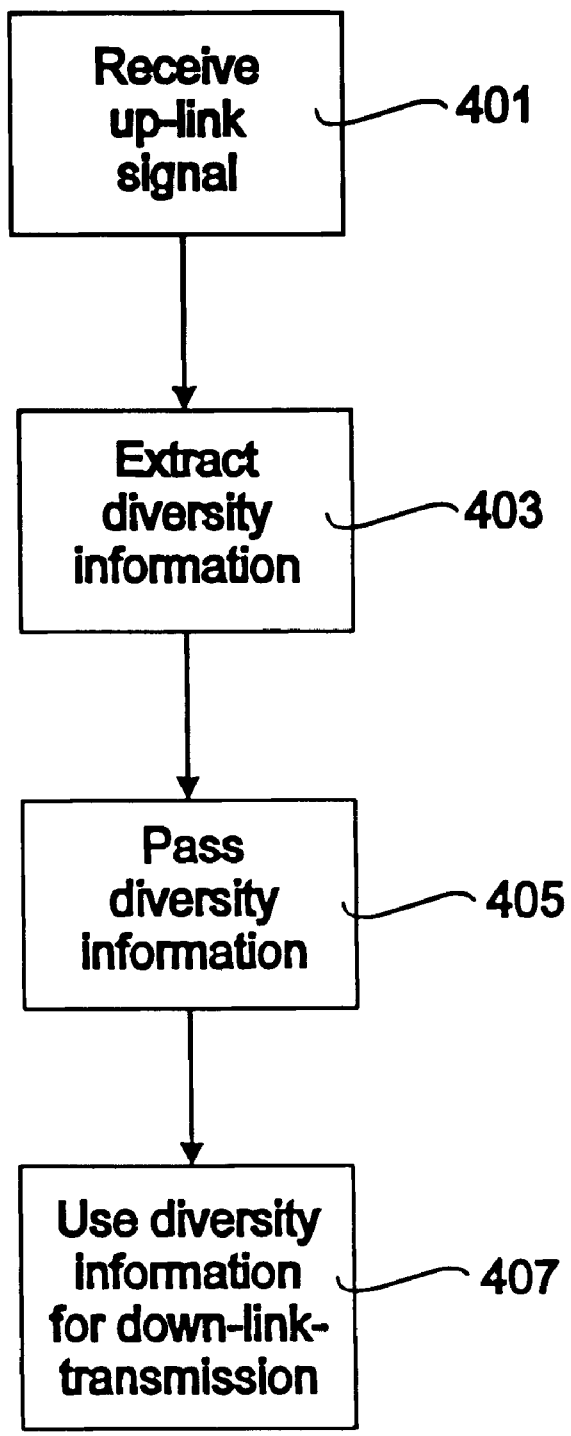
FIG. 4 is a flow chart illustrating different steps carried out when employing a down-link diversity scheme.

FIG. 4 is a flow chart illustrating the steps carried out in a base station when using a down-link transmission scheme. Thus, first in a block 401 an up-link signal is received using a suitable diversity arrangement, e.g. an antenna diversity arrangement. Next in a block 403 the information obtained from the diversity arrangement regarding the up-link signal is extracted. For example in the case when an antenna diversity system employing selection diversity is used, the information extracted is the which antenna/reception branch that currently receives the signal having the highest SNR.

Thereupon the information is passed to the transmission part of the base station in a block 405, and finally the transmission part feeds the antenna/antennas with a down-link signal using the information obtained from the receiving diversity system in a block 407. In the case when the information obtained is which antenna in an antenna diversity system that currently receives the signal having the highest SNR (selection diversity), the transmission part of the base station feeds that antenna with the down-link signal.

The method and system as described herein, which uses information derived from a diversity arrangement for receiving an up-link signal for transmission purposes, i.e. a kind of transmission diversity, enables use of a smaller signal power.

This is most valuable in today's cellular radio systems where frequency is a limited resource and reuse of frequencies at close distance is required in order to obtain a system capable of housing the increasing number of mobile stations, such as mobile telephones.

What is claimed is:

1. A radio transmission system comprising:
   a base station having a receiver diversity arrangement including first and second antenna elements for receiving a signal from a mobile station (MS),
   means in the base station for extracting information regarding current receiver diversity conditions so that said means for extracting determines a first signal-to-noise (SNR) ratio for the first antenna element of the base station and a second signal-to-noise (SNR) ratio for the second antenna element of the base station, and
   means for transmitting down-link signals according to a diversity transmission algorithm controlled in accordance with the information extracted from the receiver diversity arrangement by adjusting downlink transmission of the first antenna element to the MS based upon the first SNR ratio and adjusting downlink transmission of the second antenna element to the MS based upon the second SNR ratio.

2. A system according to claim 1, characterized in that the transmission means are controlled to apply the same diversity algorithm to the down-link signals as is currently used for receiving up-link signals.

3. A system according to claim 1, wherein an antenna diversity arrangement is used for receiving up-link signals from the MS.

4. A system according to claim 3, wherein duplex antennas receive the up-link signals so that the down-link signals can be transmitted using the same antennas.

5. A system according to claim 3, characterized in that the antennas in the antenna diversity arrangement are separated by a distance corresponding to an integer multiple of half the wavelength used in the transmission.

6. The radio transmission system of claim 1, further comprising:
   a logic unit for choosing either the signal received by the first antenna element or the signal received by the second antenna element depending upon which has the highest signal-to-noise (SNR) ratio, said logic unit using receiver diversity information based at least in part upon said choosing of either the signal received by the first antenna element or the signal received by the second antenna element in transmitting a signal to the mobile station (MS) so that only the antenna element having the highest received SNR is used to transmit the signal to the MS.

7. The radio transmission system of claim 1, further comprising:
   means for phase compensating the signal received by the first antenna and the signal received by the second antenna; and
   means for feeding transmission signals to the first and second antenna elements having the same phase compensation and the same signal strength relation as a signal-to-noise ratio (SNR) of the signal received by the first antenna element and the signal received by the second antenna element in order to control transmission of a signal from the base station to the mobile station based at least in part upon receiver diversity information.

8. A method including transmitting radio signals from a base station to a mobile station (MS), the method comprising:
   receiving an uplink signal via at least first and second antenna elements using a diversity arrangement and algorithm,
   determining a first signal-to-noise (SNR) ratio for the first antenna element of the base station and a second signal-to-noise (SNR) ratio for the second antenna element of the base station for the uplink signal(s), and
   transmitting downlink signals according to a transmit diversity algorithm based upon the determined SNR ratios by adjusting downlink transmission of the first antenna element to the MS based upon the first SNR ratio and adjusting downlink transmission of the second antenna element to the MS based upon the second SNR ratio.

9. A method according to claim 8, characterized in that the transmit diversity algorithm used is the same as the receiving algorithm.

10. A method according to claim 8, characterized in that an antenna diversity arrangement is used for receiving the up-link signals.

11. A method according to claim 10, wherein duplex antennas are used in the antenna diversity arrangement for receiving the up-link signals so that the down-link signals can be transmitted using the same antennas.

12. A method according to claim 10, characterized in that the antennas in the antenna diversity arrangement are separated by a distance corresponding to half the wavelength used in the transmission or an integer multiple of half the wavelength.

13. A base station for use in a cellular telecommunications network, the base station comprising:
   a receiver diversity arrangement including first and second antennas for receiving a signal from a mobile station (MS);
   a circuit for extracting receiver diversity information relating to a signal-to-noise ratio (SNR) of the signal received by the first antenna and the signal received by the second antenna, thereby obtaining first and second SNR ratios; and
   said circuit using the receiver diversity information to control transmission of a signal from the base station to the mobile station (MS) so that determined SNR values based upon signal(s) received on the uplink by the first and second antennas of said receiver diversity arrangement are utilized to adjust downlink transmissions, so that the circuit comprises means for transmitting downlink signals according to a diversity transmission algorithm controlled in accordance with the information extracted from the receiver diversity arrangement by adjusting downlink transmission of the first antenna to the MS based upon the first SNR ratio and adjusting downlink transmission of the second antenna to the MS based upon the second SNR ratio.

14. A method of using receiver diversity information in a base station to control transmission from the base station, the method comprising:

receiving a signal from a mobile station via at least first and second antennas;

extracting receiver diversity information based upon signal-to-noise ratios (SNR) of the signal received by the first antenna and the signal received by the second antenna; and controlling transmission of a signal from the base station to a mobile station based at least in part upon the extracted receiver diversity information so that determined SNR values based upon the signal(s) received from the mobile station by the first and second antennas are utilized to adjust downlink transmissions from the base station to the mobile station in a manner such that the first antenna, but not the second antenna, is used to transmit downlink transmissions to the mobile station when the first antenna has a received SNR higher than the second antenna, and the second antenna, but not the first antenna, is used to transmit downlink transmissions to the mobile station when the second antenna has a received SNR higher than the first antenna.

* * * * *